United States Patent [19]

Gilham

[11] Patent Number: 4,969,127

[45] Date of Patent: Nov. 6, 1990

[54] THERMAL PRINTING APPARATUS

[75] Inventor: Dennis T. Gilham, Brentwood, United Kingdom

[73] Assignee: Alcatel Business Systems Limited, Essex, United Kingdom

[21] Appl. No.: 314,962

[22] Filed: Feb. 24, 1989

[30] Foreign Application Priority Data

Feb. 25, 1988 [GB] United Kingdom ................ 8804467

[51] Int. Cl.[5] ........................................ G01D 15/10

[52] U.S. Cl. ............................ 346/76 PH; 346/1.1; 219/216; 400/120

[58] Field of Search ............ 219/216 PH; 346/76 PH, 346/1.1; 400/120

[56] References Cited

U.S. PATENT DOCUMENTS 4,471,362 11/1984 Murayama et al. ............ 346/76 PH

FOREIGN PATENT DOCUMENTS 0079774 5/1984 Japan ............................ 346/76 PH 0295086 12/1986 Japan .

0149464 7/1987 Japan ............................ 346/76 PH

*Primary Examiner*—Bruce A. Reynolds

*Assistant Examiner*—Huan Tran

*Attorney, Agent, or Firm*—Shoemaker and Mattare, Ltd.

[57] ABSTRACT

A construction of thermal print head is disclosed in which a common support includes a plurality of substrates on which selectively heatable print elements of a plurality of print heads are carried. The substrates are arranged in spaced parallel relation such as to permit deposition of conductors and insulation layers on a face of the substrates. Print element selection and drive circuits may be mounted on the substrates and a printed circuit multi-conductor ribbon cable provides connections to the print heads. The print heads print serially on an item and may be operated to print different portions of a print impression in the same color with one print ribbon or may print differently colored portions with different colored ribbons. The thermal print head may be used for printing a franking impression in a postage franking meter.

13 Claims, 2 Drawing Sheets

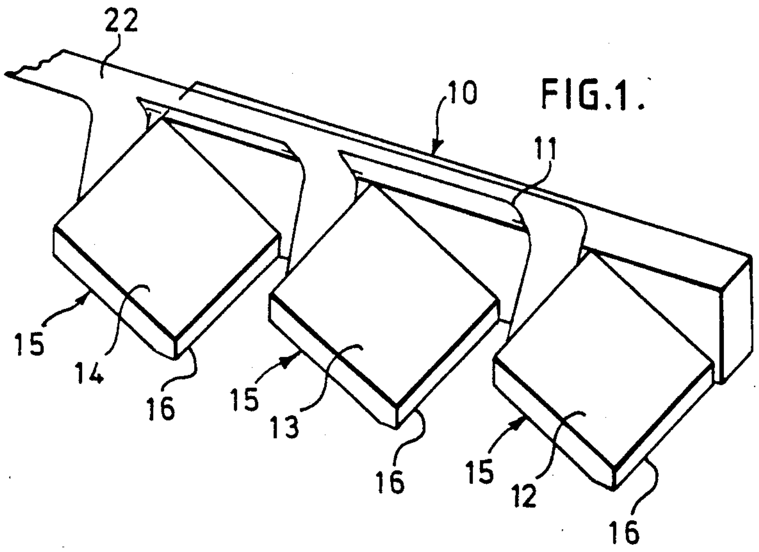
FIG.1.
FIG.2.
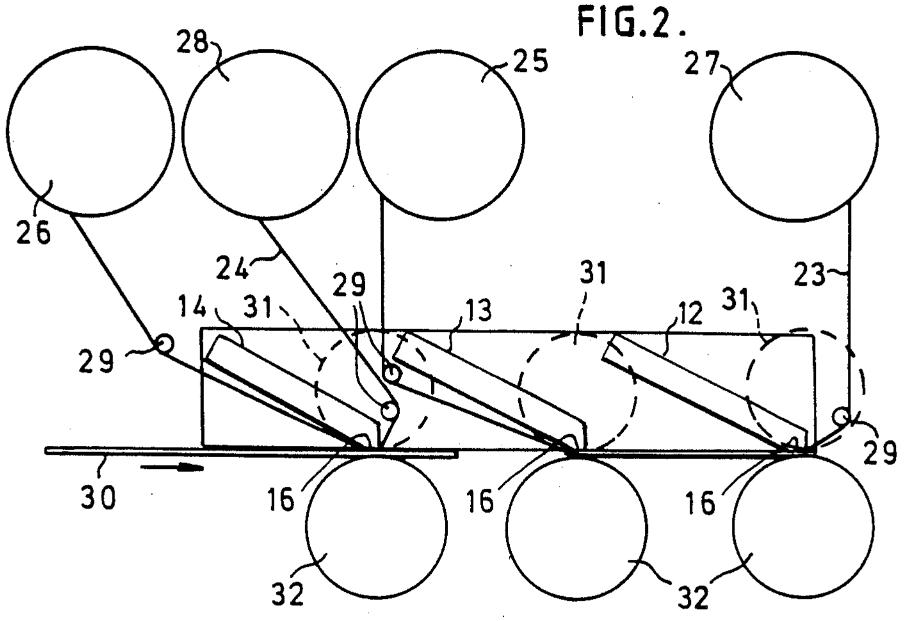

THERMAL PRINTING APPARATUS

BACKGROUND OF THE INVENTION

This invention relates to thermal printing apparatus and in particular to the construction of printing heads for use in thermal printing apparatus.

Known thermal printing apparatus operates by selectively heating areas of a thermal transfer ribbon, comprising a substrate film carrying a layer of ink, to effect transfer of ink from the ribbon onto the surface of an item on which printing is desired. Generally a thermal printing head is utilised which has a row of selectively heatable print elements and these print elements are heated in synchronism with the passage of the surface, on which printing is to be effected, past the print elements. A known construction of thermal printing head comprises a substrate acting as a heat sink on which a strip of electrically resistive material is deposited. Electrically conductive tracks are deposited to provide a plurality of electrical connections at positions spaced along the length of the resistive strip, layers of electrically insulating material being deposited to electrically insulate the conductive tracks from one another. By causing electrical current to flow from one selected connection to another selected connection through that portion of resistive element extending between those selected connections, that portion of resistive element is heated. The resistive element is disposed to extend across the direction of travel of the item to be printed and accordingly any desired pattern may be printed by repeated selective electrical energisation of selected portions of the resistive element as the thermal transfer ribbon and the surface of the item to be printed are moved past the resistive element. The substrate of the printing head acts as a heat sink to carry away the heat generated in energisation of the resistive element in order to prevent the energisation of the portions of the element having a persistent effect on the transfer ribbon.

Known constructions of thermal print head tend to be relatively slow in operation compared with other forms of selective printing heads. While it has been possible to print in more than one colour during a printing operation by the use of multi-colour ribbons, multi-colour ribbons are expensive, complex and inflexible. It is desirable to increase the speed at which printing can be effected and to be able to select the colour of printing as desired during a printing operation.

SUMMARY OF THE INVENTION

According to one aspect of the invention a multi-stage thermal print head construction comprises a common support member including thermally conductive substrates for each stage respectively; a plurality of selectively heatable print elements on each substrate; means for selectively energising and heating said print elements.

Preferably the thermally conductive substrates are formed integrally with the common support member.

It is preferred to dispose the selectively heatable print elements in a common plane.

Connection means common to all the stages of the print head may be provided for external electrical connections to the stages of the print head.

According to another aspect of the invention a printer includes a multi-stage print head construction as hereinbefore defined.

The printer may be provided with a thermal transfer ribbon of first colour to co-operate in a printing operation with one of the stages of the print head and provided with a ribbon of second colour different from said first colour to co-operate in a printing operation with a second of the stages of the print head.

The printer may be provided with means to feed a thermal ribbon past two or more stages of the print head.

The thermal transfer ribbon may be a multi-layer ribbon in which ink is removed successively from different layers by successive print head stages.

The thermal transfer ribbon may be a multi-use ribbon in which ink is contained in a porous layer and is removed progressively by successive print head stages.

According to another aspect of the invention a postal franking machine incorporates a multistage print head or a printer as hereinbefore defined.

BRIEF DESCRIPTION OF THE DRAWING

An embodiment of the invention will now be described with reference by way of example to the drawings in which:

FIG. 1 is a view of a multi-stage print head

FIG. 2 is a front view of the print head of FIG. 1 shown in combination with feed means for the thermal transfer ribbon and an item to be printed and FIG. 3 is a diagram showing the electrical arrangement of resistive element and conductive tracks connected thereto.

DESCRIPTION OF THE PREFERRED EMBODIMENT

Figure 3:
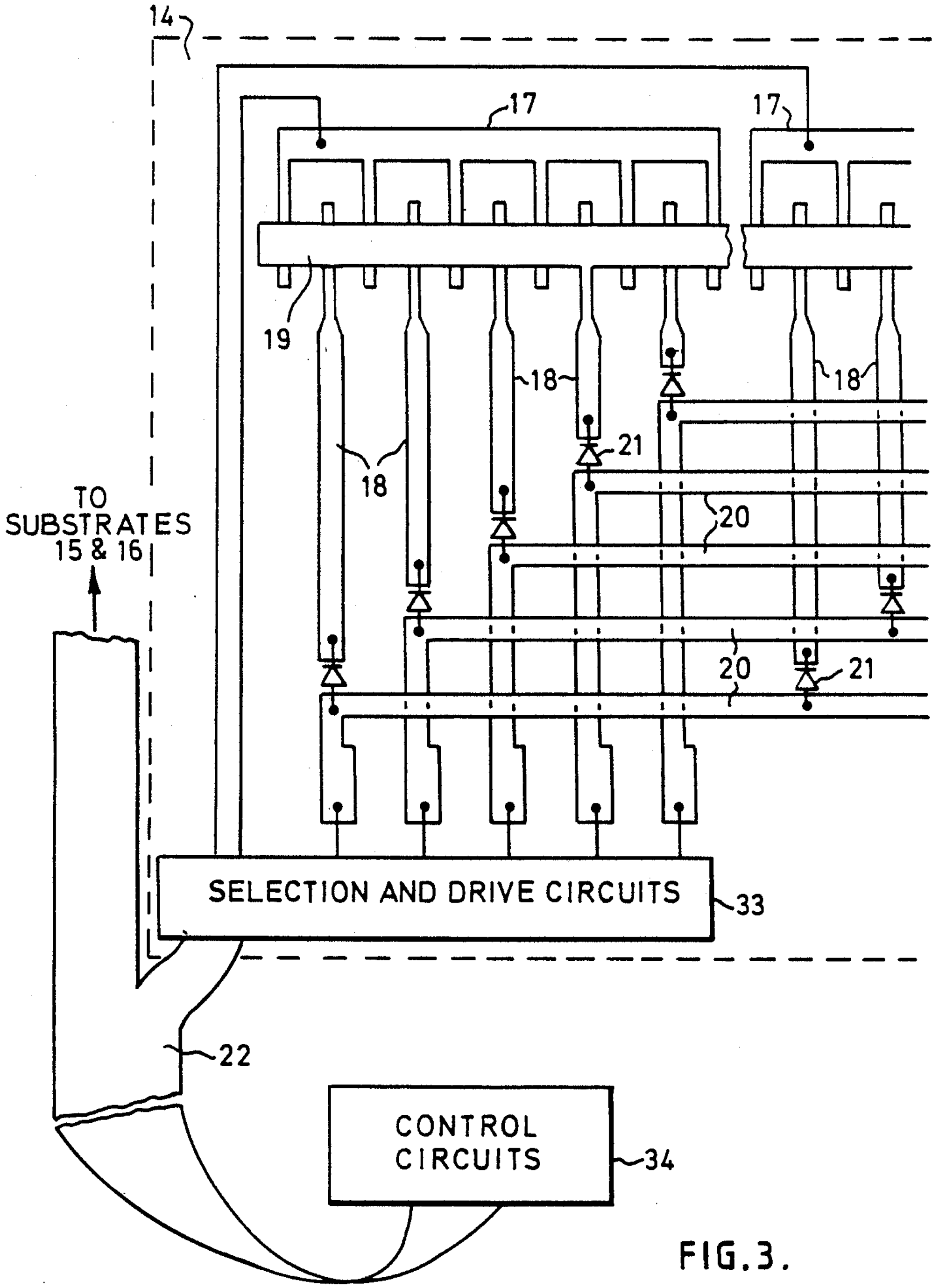

Referring first to FIG. 1 a multi-stage thermal print is formed on a common support 10 consisting of a block 11 from which three individual head substrates 12,13,14 project. The common support 10 is formed of material having high heat conducting properties and may, for example, be aluminium. A preferred manner of manufacturing the common support is by a precision moulding process. The substrates 12,13,14 are of similar or identical form. Each substrate has a planar surface 15 sloping down to a lower edge 16, as seen in FIGS. 1 and 2 of the drawings. This lower edge 16 is slightly rounded to provide a suitable line of contact with a thermal transfer ribbon and item to be printed as will be explained hereinafter. The edges 16 are disposed to lie in a common plane. The planar surfaces of the substrates extend substantially parallel to one another. The stages of the multi-stage print head are formed on the substrates 12,13,14 respectively. Each head includes a strip of electrically resistive material disposed to extend along or immediately adjacent the edge 16 and a plurality of electrically conductive tracks disposed to make electrical connections to the resistive strip at a plurality of spaced positions along the length of the strip. An electrical arrangement of the resistive strip and conductive tracks is illustrated in FIG. 3. Initially an electrically insulating layer is deposited on the surfaces 15 of the substrates and then a pattern of electrically conductive material is deposited to provide one or more common groups of conductor tracks 17 and groups of selection tracks 18. A strip of electrically resistive material 19 is deposited to extend across and make electrical connection with the tracks 17 and 18. As will be seen the common conductor tracks 17 make electrical connection to the resistive strip 19 at spaced positions along the length of the resistive strip 19. The selection tracks 18 are disposed to make electrical connection to the resistive strip 19 at positions intermediate to those at which the common tracks make connection with the strip. Where, as shown in FIG. 3, a plurality of groups of common conductors 17 are provided, the selection conductors 18 are connected in groups to common selection drive conductors 20. In order to provide the required interconnections, portions of the selection drive conductors extend across other conductive tracks and accordingly these portions are formed in a layer insulated from the tracks by a layer of electrically insulating material deposited over the earlier deposited tracks. These portions of the conductors are electrically connected where required to the underlying tracks by means of conductive vias extending through the thickness of the insulating layer. In order to prevent the flow of electrical current through unselected paths, the selection tracks 18 are connected to the drive selection conductors by means of diodes 21.

Selection and drive circuits 33 for energising selected ones of the selection drive conductors 18 and selected ones of the groups of common tracks 17 are provided and may be mounted on the surfaces 15 of the substrates 12,13,14. The selection and drive circuits comprise semi-conductor components and may include semi-conductor integrated circuits. A printed circuit multi-conductor ribbon cable 22 on a flexible substrate is provided to make connections to the selection and drive circuits 33 on the substrates from control circuits 34 in the printing apparatus. In cases where it is desired not to mount the selection circuits on the substrates of the print heads, the flexible printed circuit ribbon cable makes direct connection to the selection drive conductors 20.

In operation of the print heads, an electrical current will flow through those portions of the resistive strip 19 lying between a conductor track 17 of a selected group of common tracks and a selectively energised selection track 18. As a result localised heating of the resistive strip will occur.

FIG. 2 shows a multi-stage thermal print head, as described hereinbefore, incorporated in a printing apparatus. Thermal transfer ribbons 23, 24 are fed from supply reels 25,26 past the edges 16 of the print heads and thence to take up reels 27,28, guide rollers 29 are provided where required for guiding the ribbons along their respective paths. Items 30 on which printing is to be effected are fed, from left to right as seen in FIG. 2, by means of feed rollers 31 and co-operating pressure rollers 32. The pressure rollers may be resilient or resiliently mounted such as to press the items 30 and the ribbons 23,24 toward the resistive strips 19 extending along the edges 16 of the heads. The pressure rollers 32 extend axially beyond the print head structure and the feed rollers 31 are disposed in pairs to co-operate with the end portions of the pressure rollers. It will be appreciated that the disposition of the edges 16 in a common plane enables an item on which printing is to be effected to pass in a linear path past the stages of the print head.

The substrates of the print head stages are spaced apart by a distance sufficiently large to enable the layers of materials to be deposited on the surfaces 15 without interference from the presence of an adjacent one of the substrates.

A print head structure as described hereinbefore provides considerable flexibility in meeting varying printing requirements. For example, when it is desired to print in more than one colour, differently coloured ribbons may be provided for the print heads and the print heads are then energised according to the print colour required at any time. By synchronising energisation of the heads, the heads may be energised in such a manner as to print a multi-coloured print pattern. Alternatively the multi-stage head may be utilised to decrease the time required to print a required print pattern by operating two or more of the heads simultaneously to print different portions of the print pattern. Thus for example the head on substrate 12 could be energised to print the right hand half of a print pattern while the head on substrate 13 is energised to print the left hand half of the print pattern. Where two of the heads are required to print in the same colour, a single ribbon may be provided for these heads provided that the print patterns to be printed by the two heads respectively do not require ink to be transferred from the same areas of the ribbon. A single ribbon may be used for more than one head, even if the print patterns printed by the respective heads require transfer of ink from the same areas of ribbon, if a multi-layer or multi-use ribbon is utilised. In this case, ink from one layer is transferred by one head whereas when the ribbon passes a second head ink is transferred from that one layer if it is still available or from a lower layer if that area of the first layer has been used already.

The construction of multi-stage thermal printer head described hereinbefore also provides benefits in the construction and servicing of thermal printers in that the heads form an integral structure which may be easily removed from a printer for servicing and may be easily remounted in the printer without requiring any adjustments to ensure that the stages of the head are correctly and precisely positioned relative to one another.

Multi-stage thermal print heads and printers incorporating such heads are particularly suitable for use in postal franking machines. Such machines are utilised to print a franking impression on mail items and frequently are required to print additional information such as a slogan relating to the user of the franking machine. Also for automatic handling of mail items, the franking machine may be required to print information in machine readable form such as a bar code. The multi-stage head construction described hereinbefore allows the head stages to be allocated to the printing of specific portions of the total impression required under the control of the control circuits 34, for example one stage may print the franking impression, another stage may print the slogan and a third stage may print information in machine readable form. Where desired the different portions of the impression may be printed in different colours. Furthermore, whereas the speed of operation of thermal printing heads may be unacceptably slow for some franking machines, the provision of multiple stages permits a decrease in the time required for printing the total franking impression on each item so that the items may be dealt with at an acceptable rate. When the multi-stage print head is incorporated in a postal franking machine, the control circuits 34 include circuits for receiving postage values desired to be printed and for carrying out accounting functions as required in postal franking machines.

I claim:

1. A multi-stage thermal print head comprising a common support member;

a plurality of thermally conductive substrates carried in spaced relationship by said support member;

each substrate projecting from said common support member and having an edge extending away from said common support member; said edges of said substrates extending substantially parallel and in a common plane;

a plurality of selectively heatable printing elements carried by said substrates respectively and extending adjacent said edge of each said respective substrate; and means for selectively energising said printing elements with electric current to heat selected ones of said elements on each of said plurality of substrates.

2. A multi-stage thermal print head as claimed in claim 1 wherein said common support member and said plurality of thermally conductive substrates comprise an integral structural element.

3. A printer including a multi-stage thermal print head as claimed in claim 1 including means to feed a thermal ink transfer ribbon along a path in which the ribbon passes adjacent the printing elements carried by one of said plurality of substrates and between said one substrate and a second substrate adjacent to said one substrate.

4. A postal franking machine incorporating a thermal printer as claimed in claim 3.

5. A printer including a multi-stage thermal print head as claimed in claim 1 including means to feed a thermal ink transfer ribbon along a path in which the ribbon passes adjacent the printing elements carried by first and second adjacent ones of said plurality of substrates and between said second substrate and a third substrate of said plurality of substrates adjacent said second substrate.

6. A postal franking machine incorporating a thermal printer as claimed in claim 5.

7. A printer including a multi-stage thermal print head as claimed in claim 1 including first means to feed a first thermal ink transfer ribbon along a first path in which said first ribbon passes adjacent the printing elements carried by a first one of said plurality of substrates and between said first substrate and a second one of said plurality of substrates adjacent to said first substrate; and second means to feed a second thermal ink transfer ribbon along a second path in which said second ribbon passes adjacent the printing elements carried by said second substrate and between said first and second substrates.

8. A postal franking machine incorporating a multi-stage thermal print head as claimed in claim 1.

9. A multi-stage thermal print head comprising a common support member having a face;

a plurality of thermally conductive substrates carried in spaced relationship by said support member; each substrate projecting from said face of said common support member and having an edge extending away from said common support member substantially perpendicular to said face; said edges of said substrates extending substantially parallel and in a common plane;

a plurality of selectively heatable printing elements carried by said substrates respectively and extending adjacent said edge of each said respective substrate; and means for selectively energising said printing elements with electric current to heat selected ones of said elements on each of said plurality of substrates.

10. A multi-stage thermal print head as claimed in claim 9 wherein each substrate has a planar surface extending substantially perpendicular to the face of the common support member and extending to the edge of the substrate at an acute angle to the common plane in which the edges of the plurality of substrates lie; and wherein each substrate carries on said planar surface thereof a plurality of conductive tracks providing electrical connection to the printing elements carried by the substrate.

11. A multi-stage thermal print head as claimed in claim 10 wherein the printing elements extend along the edge of the substrate.

12. A multi-stage print head as claimed in claim 11 including a multi-conductor ribbon cable electrically connected to the conductive tracks on each of said plurality of substrates.

13. A method of manufacturing a multi-stage thermal print head comprising the steps of:

forming an integral element comprising a plurality of substrates extending from a common support member, said substrates each having an edge extending away from the common support member in a common plane and a planar face extending away from the common support member and extending at an acute angle to said common plane, said planar faces of said plurality of substrates being substantially parallel to one another; and thereafter depositing on each substrate a layer of electrically insulating material, a strip of electrically resistive material on said layer of insulating material and extending adjacent said edge of the substrate, electrically conductive tracks on said layer of insulating material and extending over the planar face of the substrate to electrically connect at spaced positions along said strip of resistive material to define thermal printing elements in said strip.

* * * * *